(12) United States Patent
Otsuka et al.

(10) Patent No.: US 8,137,574 B2
(45) Date of Patent: Mar. 20, 2012

(54) PROCESSING METHOD OF GLASS SUBSTRATE, AND HIGHLY FLAT AND HIGHLY SMOOTH GLASS SUBSTRATE

(75) Inventors: Koji Otsuka, Tokyo (JP); Hiroshi Kojima, Tokyo (JP); Masabumi Ito, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/233,884

(22) Filed: Sep. 19, 2008

(65) Prior Publication Data

US 2009/0017257 A1    Jan. 15, 2009

Related U.S. Application Data

(63) Continuation of application No. PCT/JP2007/058382, filed on Apr. 11, 2007.

(30) Foreign Application Priority Data

Apr. 12, 2006    (JP) .................................. 2006-109937

(51) Int. Cl.
  *B44C 1/22* (2006.01)
  *C03C 15/00* (2006.01)
(52) U.S. Cl. ................ 216/38; 216/59; 216/67; 216/74; 216/75; 216/84; 216/88; 216/97; 216/101; 204/192.33; 204/192.34; 451/1; 451/41
(58) Field of Classification Search .................. None
See application file for complete search history.

(56) References Cited

U.S. PATENT DOCUMENTS

| | | | | |
|---|---|---|---|---|
| 5,449,314 | A * | 9/1995 | Meikle et al. | 438/692 |
| 6,396,988 | B1 * | 5/2002 | Shimoda | 385/129 |
| 7,462,574 | B2 * | 12/2008 | Iwahashi et al. | 501/54 |
| 7,622,050 | B2 * | 11/2009 | Otsuka et al. | 216/66 |

(Continued)

FOREIGN PATENT DOCUMENTS

EP    1 253 117    10/2002

(Continued)

OTHER PUBLICATIONS

Japanese Office Action issued Mar. 29, 2011, in Patent Application No. 2006-109937 (with English-language translation).

Primary Examiner — Anita Alanko
(74) Attorney, Agent, or Firm — Oblon, Spivak, McClelland, Maier & Neustadt, L.L.P.

(57) ABSTRACT

The present invention is to provide a processing method for manufacturing a highly flat and highly smooth glass substrate with good productivity. A highly flat and highly smooth glass substrate is obtained with good productivity by processing of a glass substrate, which comprises a step of measuring the surface shape of the glass substrate prior to processing, a step of processing the surface of the substrate by changing a processing condition for each site (first processing step), and a step of finish-polishing the surface of the glass substrate that has been subjected to the first processing step (second processing step). At that time, the processing condition for each site within the surface of the substrate in the first processing step is determined from a processing amount that is determined from the concave-convex shape of the surface of the glass substrate prior to processing and the in-plane distribution of a processing amount by the second processing step separately measured by using a similar substrate.

28 Claims, 5 Drawing Sheets

U.S. PATENT DOCUMENTS

| | | |
|---|---|---|
| 2003/0022400 A1* | 1/2003 | Nomoto et al. .................. 438/14 |
| 2003/0186624 A1 | 10/2003 | Koike et al. |
| 2004/0192063 A1 | 9/2004 | Koike et al. |
| 2004/0192171 A1* | 9/2004 | Koike ................................ 451/5 |
| 2007/0051699 A1* | 3/2007 | Kiehlbauch et al. ............. 216/67 |
| 2007/0138140 A1* | 6/2007 | Teng et al. ....................... 216/84 |
| 2007/0259605 A1* | 11/2007 | Otsuka et al. ...................... 451/8 |
| 2008/0142480 A1* | 6/2008 | Otsuka ............................ 216/59 |
| 2009/0233192 A1* | 9/2009 | Otsuka et al. ..................... 430/5 |
| 2010/0190414 A1* | 7/2010 | Harada et al. .................... 451/41 |

FOREIGN PATENT DOCUMENTS

| | | |
|---|---|---|
| JP | 08-293483 | 11/1996 |
| JP | 2001-315351 | 11/2001 |
| JP | 2002-316835 | 10/2002 |
| JP | 2004-291209 | 10/2004 |
| JP | 2006-8426 | 1/2006 |
| WO | 2005-123617 | 12/2005 |
| WO | 2005-123857 | 12/2005 |
| WO | 2006-082751 | 8/2006 |
| WO | 2006-135098 | 12/2006 |
| WO | WO 2006135098 A1 * | 12/2006 |

* cited by examiner

PROCESSING METHOD OF GLASS SUBSTRATE, AND HIGHLY FLAT AND HIGHLY SMOOTH GLASS SUBSTRATE

TECHNICAL FIELD

The present invention relates to a processing method for producing a highly flat and highly smooth glass substrate. In particular, the invention relates to a method of processing a surface of a glass substrate to which high flatness and smoothness are required as in the case of reflective mask substrates for use in EUV lithography in a semiconductor device manufacturing process. This method can also be applied to a transmission type mask substrate to be used for ArF lithography.

BACKGROUND ART

A reflective mask substrate to be used in a lithography technology using light in a soft X-ray region or vacuum ultraviolet region having a wavelength of from approximately 0.2 to 100 nm (The substrate, lithography and light are hereinafter referred to as "substrate for EUVL", "EUVL" and "EUV light", respectively.) is required to have a high flatness of a surface of the substrate such that a strain is not generated on a transferred image even upon irradiation of EUV light and also to have a small surface roughness so that a high reflectance is obtained, namely it is required to be highly flat and highly smooth. In addition, in order to suppress influences due to the temperature change, it is required that a coefficient of thermal expansion is low. For that reason, it is preferably used as the substrate for EUVL a substrate resulting from a quartz glass substrate containing $SiO_2$ as a major component, in particular a quartz glass with low thermal expansion which has been made to have low thermal expansion by incorporating $TiO_2$ as a dopant, through processing to give high flatness and high smoothness. Though the shape, size, thickness, etc. of the substrate for EUVL are not limited, usually used substrate are plate-shaped bodies having a rectangular or square planar shape, a substrate size of typically 152 mm in square, and an effective area of the substrate, which is to be highly flat and highly smooth, is 142 mm in square.

In mechanical polishing, even if it is intended to process the surface of the foregoing substrate so as to give high flatness and high smoothness, there is a problem in flatness that a concave-convex shape which is a periodical series of a convex and a concave is formed within the surface of the substrate. In such a concave-convex shape, the distance from one convex to an adjacent convex is typically from 75 to 150 mm. For that reason, it was difficult only by the mechanical polishing to obtain a flatness of not more than 0.15 μm in terms of PV (peak-to-valley), which is required for a substrate of a reflective mask for EUVL. As a method of obtaining a desired highly flat surface free from such a concave-convex shape, Patent Documents 1, 2 and 3 disclose methods of obtaining a flat surface shape by carrying out processing through optimizing local processing amounts while employing a processing method such as gas cluster ion beam etching, plasma etching or polishing with a magnetic viscous fluid.

However, when dry etching is applied to a glass substrate, defects inherent to the dry etching are caused; and when polishing with a magnetic viscous fluid is applied, defects inherent to the polishing with a magnetic viscous fluid are caused, resulting in a problem that the surface roughness becomes large. Patent Document 3 discloses a method of improving such surface roughness or defects by employing non-contact polishing such as EEM.

Patent Document 1: JP-A-8-293483
Patent Document 2: JP-A-2002-316835
Patent Document 3: JP-A-2004-291209

DISCLOSURE OF THE INVENTION

When the surface of a glass substrate is processed by dry etching by gas cluster ion beam etching, plasma etching or polishing with a magnetic viscous fluid, there is a problem that the surface roughness becomes large. In order to remove or improve the surface roughness, it is necessary to employ a smoothening process by an $O_2$ gas cluster or non-contact polishing such as EEM. However, since these processing have low processing rates, there is a problem that a long time is required, resulting in a reduced productivity.

The invention is aimed to solve the problems involved in the conventional technologies.

Accordingly, an object of the invention is to provide a processing method that processes the surface of a glass substrate so as to give high flatness and high smoothness with good productivity.

Another object of the invention is to provide a highly flat and highly smooth glass substrate processed by such a processing method.

Other objects and effects of the invention will become apparent from the following description.

Specifically, the invention provides a processing method of a glass substrate by processing a surface of a glass substrate, which comprises:

a step of measuring a flatness of a glass substrate prior to processing at each site within a surface of the substrate (flatness distribution measurement step);

a step of processing the surface of the glass substrate that has been subjected to the flatness distribution measurement while changing a processing condition for each site within the surface of the substrate (first processing step); and a step of finish-polishing the surface of the glass substrate that has been subjected to the first processing step (second processing step), wherein an in-plane distribution of the processing amount by the second processing step is separately measured by using a similar glass substrate, and wherein the processing amount for each site within the surface of the substrate in the first processing step is determined from the flatness distribution within the surface of the substrate prior to processing as measured in the flatness distribution measurement step and the in-plane distribution of the processing amount by the second processing step.

Also, the invention provides a processing method of a glass substrate by processing a surface of a glass substrate, which comprises:

a step of measuring a flatness of a glass substrate prior to processing at each site within a surface of the substrate (flatness distribution measurement step);

a step of processing the surface of the glass substrate that has been subjected to the flatness distribution while changing a processing condition for each site within the surface of the substrate (first processing step); and a step of finish-polishing the surface of the glass substrate that has been subjected to the first processing step (second processing step), wherein the first processing step is carried out by ion beam etching, gas cluster ion beam etching, plasma etching, or polishing with a magnetic viscous fluid, wherein an in-plane distribution of the processing amount by the second processing step is separately measured by using a similar glass substrate, and wherein a processing condition for each site within the surface of the substrate in the first processing step is determined from a processing amount that is determined from the flatness distribution within the surface of the substrate prior to processing as measured in the flatness distribution measurement step and the in-plane distribution of the processing amount by the second processing step.

In the foregoing processing methods, the glass substrate is preferably a glass substrate made of a quartz glass containing $SiO_2$ as a major component, and more preferably a $TiO_2$-doped synthetic quartz glass with low thermal expansion.

Also, in the processing method of a glass substrate of the invention, it is more preferred that a relationship between a distribution of dopant concentration within the surface of the glass substrate and a processing rate of the first processing step to the dopant concentration of the glass substrate is separately determined prior to carrying out the first processing step; and that the processing condition for each site within the surface of the substrate in the first processing step is determined from: a processing amount determined from the in-plane distribution of the processing amount by the second processing step and the flatness distribution of the surface of the glass substrate prior to processing as measured in the flatness distribution measurement step; a distribution of the dopant concentration; and a relationship between the processing rate in the first processing step and the dopant concentration. This embodiment gives an effect of providing a glass surface having further high flatness in the case where the glass substrate to be processed is made of glass containing a dopant.

The invention provides a highly flat and highly smooth glass substrate having a surface with a flatness of not more than 0.05 μm in terms of PV and a surface roughness measured by an atomic force microscope of not more than 0.25 nm in terms of RMS. In addition, the invention provides a highly flat and highly smooth glass substrate as processed by the foregoing processing method of a glass substrate, having a surface with a flatness of not more than 0.05 μm in terms of PV and a surface roughness measured by an atomic force microscope of not more than 0.25 nm in terms of RMS.

By using the processing method of a glass substrate according to the invention, it is possible to manufacture a highly flat and highly smooth glass substrate with good productivity.

BEST MODE FOR CARRYING OUT THE INVENTION

Figure 1:
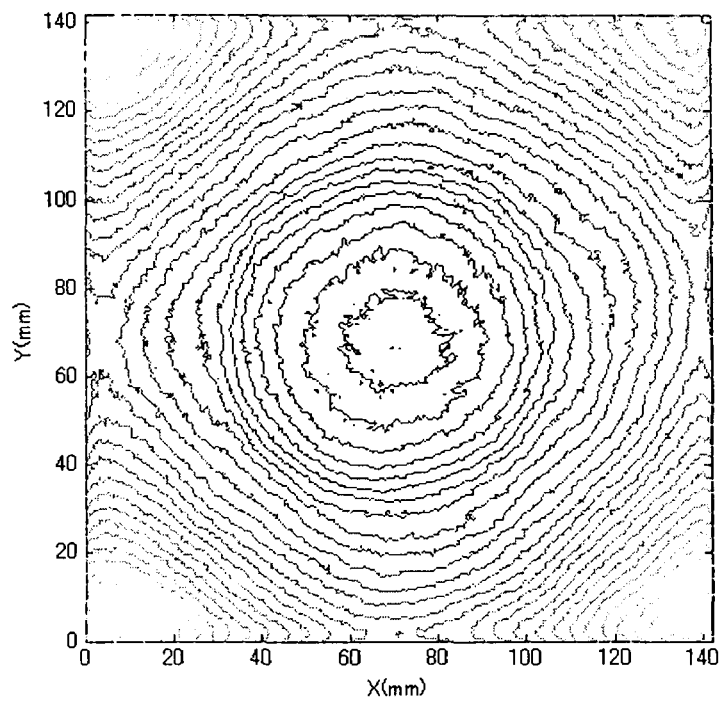
FIG. 1 is a graph of measurement results of the flatness of a glass substrate sample after preliminary polishing.

In the processing method of a glass substrate according to the invention, the surface of a glass substrate is processed by a processing method comprising a step of measuring a flatness distribution of the surface of a glass substrate prior to processing, a step of processing the surface of the glass substrate that has been subjected to the flatness distribution measurement while changing a processing condition for each site within the surface of the substrate (first processing step), and a step of finish-polishing the surface of the glass substrate that has been subjected to the first processing step (second processing step).

The flatness of the glass substrate, for example, in the case of a substrate of 152 mm in square, is determined by measuring a surface shape for an effective area of 142 mm in square by using a flatness measuring instrument. Specifically, the flatness referred to herein represents a displacement of the surface of the substrate from a standard plane. The standard plane is determined by measuring a surface shape of an effective area on a glass substrate by using a flatness measuring instrument, and determining a least squares plane from the measured surface shape, the least square plane being taken as a standard plane. Examples of the flatness measuring instrument include a laser interference type flatness measuring instrument represented by a G310S Fizeau type interference flatness measuring instrument (manufactured by Fujinon Corporation), a laser displacement meter, an ultrasonic displacement meter, and a contact type displacement meter, but are not limited thereto. In this specification, the expression "highly flat" means that the flatness within the surface of the effective area of the substrate is not more than 0.15 μm in terms of PV.

The surface roughness of the glass substrate is measured by using an atomic force microscope. In this specification, the surface roughness refers to an RMS (root mean square roughness) value of a surface roughness measured by scanning at a line number of 512 with a probe having a typical tip curvature of 10 nm by using SPA460, manufactured by Seiko Instruments Inc. In this specification, the expression "highly smooth" means that the surface roughness of the effective area of the substrate is not more than 0.15 nm in terms of RMS.

Though the glass substrate which is processed by the processing method of the invention is not particularly limited, a quartz glass substrate containing $SiO_2$ as a major component is preferably used. The processing method of a glass substrate according to the invention can be especially preferably used as a processing method for preparing a substrate of a reflective mask for EUVL by processing, so as to give high flatness and high smoothness, to a glass substrate made of a quartz glass with low thermal expansion which has been made to have a low coefficient of thermal expansion by incorporating a dopant. Examples of the glass with low expansion include a synthetic quartz glass containing a dopant capable of reducing a coefficient of thermal expansion, for example, $TiO_2$. Though the glass substrate is not limited with respect to shape, size, thickness etc., it is usually a plate-shaped body having a rectangular or square planar shape.

As a processing method for the first processing step, a processing method capable of performing processing of a local region and capable of processing a sufficiently small local region against a cycle of a concave-convex shape which is a periodical series of a convex and a concave present on the surface of the glass substrate is employed. That is, a processing method capable of regulating an FWHM (full width of half maximum) value of a diameter of the local region to be processed to not larger than ½ of the cycle of the concave-convex shape is employed. Specifically, it includes, but is not limited to, ion beam etching using an ion beam of a various kind, plasma etching or polishing with a magnetic viscous fluid is employable. Among them, gas cluster ion beam etching is preferably used. It is more preferred that the FWHM value of a diameter of a local region to be processed is regulated to not larger than ¼ of the cycle of the concave-convex shape. In the case where plural concave-convex shapes having a different cycle are present, it is preferred that the FWHM value of a diameter of the local region to be processed is regulated so as to fall within the foregoing range with respect to the cycle of the concave-convex shape having the smallest cycle.

In order to apply processing to the entire surface of the substrate by a processing method with a small processing region, it is preferred to perform processing while scanning over the entire surface of the substrate. As the scanning method, it is preferred to perform so-called raster scanning, but other scanning methods may also be employed. At that time, it is preferred to determine a scanning pitch while taking into consideration a processing amount profile in a local region to be processed.

The "gas cluster ion beam etching" as referred to herein is a method comprising injecting a reactive substance of a gas (source gas) into a vacuum device at normal temperature under atmospheric pressure while subjecting it to adiabatic expansion, to thereby form a gas cluster; ionizing the gas cluster by irradiation with an electron to form a gas cluster ion; accelerating the gas cluster ion in a high electric field to form a gas cluster ion beam; and irradiating a material to be processed with the beam to achieve etching processing. When a gas cluster ion beam is irradiated on the surface of the glass substrate which is a material to be processed, the surface of the glass substrate is processed owing to a multi-body collision effect between the gas cluster ion and the atom of the glass substrate surface. By reducing the beam diameter of the gas cluster ion beam, processing of a local region can be achieved.

As the source gas which is used for gas cluster ion beam etching, gases such as $SF_6$, Ar, $O_2$, $N_2$, $NF_3$, $N_2O$, $CHF_3$, $C_4F_6$, $CF_4$, $C_2F_6$, $C_3F_8$, $SiF_4$ and $COF_2$ can be used singly or in admixture. Of these, $SF_6$ and $NF_3$ are excellent as a source gas for use in processing of a glass substrate from the standpoint of reactivity with the glass. More specifically, the source gas is preferably a mixed gas containing $SF_6$ or $NF_3$, namely a mixed gas of $SF_6$ and $O_2$, a mixed gas of $SF_6$, Ar and $O_2$, a mixed gas of $NF_3$ and $O_2$, a mixed gas of $NF_3$, Ar and $O_2$, a mixed gas of $NF_3$ and $N_2$, or a mixed gas of $NF_3$, Ar and $N_2$. In these mixed gases, though a preferred mixing ratio of the respective components varies depending upon a condition such as an irradiation condition, the following ranges are preferred, respectively.

$SF_6/O_2$=0.1 to 5 vol. %/95 to 99.9 vol. % (mixed gas of $SF_6$ and $O_2$)
$SF_6/Ar/O_2$=0.1 to 5 vol. %/9.9 to 49.9 vol. %/50 to 90 vol. % (mixed gas of $SF_6$, Ar and $O_2$)
$NF_3/O_2$=0.1 to 5 vol. %/95 to 99.9 vol. % (mixed gas of $NF_3$ and $O_2$)
$NF_3/Ar/O_2$=0.1 to 5 vol. %/9.9 to 49.9 vol. %/50 to 90 vol. % (mixed gas of $NF_3$, Ar and $O_2$)
$NF_3/N_2$=0.1 to 5 vol. %/95 to 99.9 vol. % (mixed gas of $NF_3$ and $N_2$)
$NF_3/Ar/N_2$=0.1 to 5 vol. %/9.9 to 49.9 vol. %/50 to 90 vol. % (mixed gas of $NF_3$, Ar and $N_2$)

Incidentally, irradiation conditions, such as a gas cluster size, an ionizing current which is applied to an ionizing electrode of a gas cluster ion beam etching device for the purpose of ionizing a gas cluster, an accelerating voltage which is applied to an accelerating electrode of a gas cluster ion beam etching device, and a dose of a gas cluster ion beam (accumulated irradiation amount of the gas cluster ion beam in each site to be processed) are appropriately selected depending upon the kind of the source gas and surface properties of the glass substrate prior to carrying out the first processing step. For example, for the purpose of improving the flatness by removing the foregoing periodical concave-convex shape from the surface of the glass substrate without excessively deteriorating the surface roughness of the glass substrate, it is preferred that the accelerating voltage is from 15 to 30 keV.

When the first processing step is carried out, a desired surface shape is obtained. On the other hand, since defects are generated due to the first processing step, the surface roughness becomes somewhat large so that the flatness is reduced. For that reason, the second processing step, namely a step of finish polishing for conducting polishing at a minute amount by mechanical polishing under a low load is carried out subsequent to the first processing step. By conducting the second processing step, the defects generated in the first processing step are eliminated, and a highly smooth surface of the substrate with a reduced surface roughness is obtained by short-time processing. Also, in the case where an affected layer is generated on the surface by the first processing step, the affected layer can be eliminated simultaneously with the elimination of the foregoing defects by the second processing step.

It is preferred that the finish polishing is carried out by using a polishing slurry. In the finish polishing, it is preferred to perform polishing by interposing and setting a glass substrate between polishing plates provided with a polishing pad such as a non-woven fabric or a polishing cloth, and relatively rotating the polishing plates against the glass substrate while feeding a polishing slurry adjusted so as to have prescribed properties.

As the polishing pad, for example, a suede based polishing pad such as BELATRIX K7512, manufactured by Kanebo, Ltd. is used. It is preferred to use a polishing slurry containing colloidal silica; and it is more preferred to use a polishing slurry containing colloidal silica having an average primary particle size of not more than 50 nm and water and adjusted so as to have a pH in the range of from 0.5 to 4. It is especially preferred to use a polishing slurry containing colloidal silica having an average primary particle size of not more than 25 nm and water and adjusted so as to have a pH in the range of from 1 to 3.

A surface pressure for the polishing is preferably from 20 to 100 $g_f/cm^2$. When the surface pressure exceeds 100 $g_f/cm^2$, there may be a possibility that a scratch is generated or a rotation load of the polishing plate becomes large. When the surface pressure is less than 20 $g_f/cm^2$, there may be a possibility that a long time is required for processing. In order to obtain good surface properties after processing, the surface pressure is preferably not more than 60 g/cm$^2$; in order to obtain good productivity, the surface pressure is preferably 30 g/cm$^2$ or more; and the surface pressure is especially preferably 40 g/cm$^2$ or more and not more than 55 g/cm$^2$.

A processing amount in the finish polishing of the glass substrate is preferably from 10 to 200 nm because it provides a highly smooth surface having a surface roughness of not more than 0.15 nm in terms of RMS. A glass substrate having a highly smooth surface having a surface roughness of not more than 0.15 nm in terms of RMS is preferably used as a glass substrate of optical parts of exposure device for semiconductor device manufacture of the generation on and after the 45-nm generation, which are further strongly required to realize high integration and high definition, for example, a reflective mask or mirror for EUVL. When the processing amount by finish polishing is less than 10 nm, there may be a possibility that the defects are not sufficiently eliminated so that the improvement in surface roughness becomes insufficient. When the processing amount exceeds 200 nm, there may be a possibility that the flatness is deteriorated.

The feed amount of the polishing slurry, the polishing load, the rotation rate of the polishing plate, polishing time, etc. are appropriately determined while taking into consideration the polishing rate, the necessary amount of polishing and the like.

The average primary particle size of colloidal silica is more preferably less than 20 nm, and especially preferably less than 15 nm. Though the lower limit of the average primary particle size of colloidal silica is not limited, it is preferably, from the viewpoint of improving the polishing efficiency, 2 nm or more, more preferably 5 nm or more, and further preferably 10 nm or more. When the average primary particle size of colloidal silica exceeds 50 nm, it is difficult to polish the glass substrate at a desired surface roughness, and there may be a possibility that a glass substrate applicable to optical parts of an exposure device for semiconductor device manufacture of the generation on and after the 45-nm generation or the like is not obtained. Also, from the viewpoint of sensitively managing the particle size, it is desirable that the colloidal silica does not contain a secondary particle resulting from coagulation of the primary particles as far as possible. Even in the case of containing a secondary particle, its average particle size is preferably not more than 70 nm. Incidentally, the particle size of colloidal silica in the invention is one obtained by measuring images of from 15×10$^3$ to 105×10$^3$ times by using SEM (scanning electron microscope).

When the content of the colloidal silica in the polishing slurry is less than 10% by mass, there may be a possibility that the polishing efficiency becomes worse so that economical polishing is not obtained. On the other hand, when the content of the colloidal silica exceeds 30% by mass, since the use amount of the colloidal silica increases, there may be a possibility that troubles from the aspects of costs and cleaning properties are caused. That is, the content of the colloidal silica in the polishing slurry is preferably from 10 to 30% by mass, more preferably from 18 to 25% by mass, and especially preferably from 18 to 22% mass.

When the pH of the polishing slurry is made to fall within the foregoing acidic range, it is possible to chemically and mechanically polish the surface of the glass substrate, thereby polishing efficiently the glass substrate to attain good smoothness. That is, since the convex of the glass surface is softened by the acid contained in the polishing slurry, the convex can be easily eliminated by mechanical polishing. Thus, not only the polishing efficiency is improved, but also glass debris generated by polishing are softened, and hence, generation of a new scratch due to the glass debris or the like is prevented. When the pH of the polishing slurry is less than 0.5, there may be a possibility that corrosion is generated in the polishing machine to be used for finish polishing. The pH is preferably 1 or more from the viewpoint of handling of the polishing slurry. In order to obtain chemical polishing effects sufficiently, the pH is preferably not more than 4, and especially preferably in the range of from 1.8 to 2.5.

The pH of the polishing slurry can be adjusted by adding an inorganic acid or an organic acid singly or in combination. Examples of the inorganic acid which can be used include nitric acid, sulfuric acid, hydrochloric acid, perchloric acid, and phosphoric acid, with nitric acid being preferred in view of easiness of handling. Examples of the organic acid include oxalic acid and citric acid.

As the water to be used in the polishing slurry, pure water or ultra-pure water from which foreign matters have been removed is preferably used. That is, pure water or ultra-pure water whose number of fine particle having a maximum size, as measured by a light scattering system using laser light or the like, of 0.1 μm or more is substantially not more than 1 piece per milliliter is preferred. Regardless of the material or shape, when the foreign matters are intermixed in an amount of more than 1 piece per milliliter, there may be a possibility that surface defects such as a scratch and a pit are formed on the polished surface. The foreign matters in pure water or ultra-pure water can be removed by, for example, filtration or ultrafiltration with a membrane filter, but the removal method of foreign matters is not limited thereto.

In the processing method of a glass substrate according to the invention, the processing amount for each site within the surface of the substrate in the first processing step is determined from the flatness of the surface of the substrate prior to carrying out the first processing step and the in-plane distribution of the preliminarily determined processing amount by the second processing step (finish polishing).

The flatness of the surface of the glass substrate prior to carrying out the first processing step is determined as a displacement from a standard plane of a surface shape obtained by measuring a surface shape of an effective area on a glass substrate prior to processing by using a flatness measuring instrument. Also, a flat plane which is in parallel to the standard plane and which is tangent to the lowest concave of the concave-convex shape is defined as a target processed surface. The in-plane distribution of the processing amount by the second processing step (finish polishing) is determined by carrying out the second processing step (finish polishing) under the same processing condition against a glass substrate having the same properties and known surface shape and then measuring the resulting surface shape in the same manner as described above.

Assuming a two-dimensional coordinate system on the surface of the glass substrate, when a displacement of the surface of the substrate prior to the processing according to the invention at a point of the coordinate (x, y) from the target processed surface is taken as S(x, y), the relationship between a processing amount $E_1(x, y)$ by the first processing step and a processing amount $E_2(x, y)$ by the second processing step is expressed by the following expression (1).

$$E_1(x,y)=S(x,y)-E_2(x,y) \tag{1}$$

That is, when the displacement S(x, y) of the surface of the substrate prior to processing from the target processed surface and the processing amount $E_2(x, y)$ by the second processing step are determined in advance, a highly flat substrate surface is obtained by carrying out the first processing step at the processing amount $E_1(x, y)$ determined from the expression (1).

In order to carry out the processing with a desired processing amount $E_1(x, y)$ in each point $(x, y)$ within the surface of the substrate, when a gas cluster ion beam is subjected to raster scanning within the surface of the substrate, the processing rate may be changed by changing the irradiation intensity of the gas cluster ion beam by adjusting a condition such as a mixing ratio of the foregoing source gas, an ionizing current to be applied to the ionizing electrode, and an accelerating voltage. However, when a relative movement rate of the glass substrate and the gas cluster ion beam is adjusted while keeping the processing rate constant, thereby changing the dose of the gas cluster ion beam for each point on the substrate, the processing amount can be easily and stably controlled, and therefore, such is preferred.

In the case where the glass substrate to be processed is a dopant-containing glass such as a $TiO_2$-doped quartz glass with low thermal expansion, it is thought that the dopant concentration has a distribution within the surface of the substrate. In general, since the processing rate by gas cluster ion beam etching or plasma etching varies depending upon the concentration distribution of the dopant, in order to obtain a desired surface shape by the first processing step, it is preferred to carry out the first processing step by determining a processing condition from the relationship between the dopant concentration at each site within the surface of the substrate and the processing rate of the first processing step against the dopant concentration. By carrying out the first processing step in this way, a further highly flat substrate surface is obtained. For that reason, it is preferred that not only the dopant concentration distribution within the surface of the substrate is measured prior to carrying out the first processing step, but also the relationship between the dopant concentration in the glass substrate and the processing rate by the first processing step is determined by using a glass having a known dopant concentration.

Though the dopant concentration distribution within the surface of the substrate may be measured for every substrate to be processed, a dopant concentration distribution obtained by measuring only a representative sample among a series of substrates having the same properties can also be employed as a representative.

Also, with respect to the finish polishing, in the case where the processing amount of finish polishing is influenced by the dopant concentration distribution within the surface of the substrate, it is preferred to determine the processing amount by the first processing step at each site within the surface of the substrate while taking into consideration a portion of change in the processing amount of the finish polishing due to the dopant concentration distribution within the surface of the substrate.

The glass substrate processed by finish polishing is then cleaned. By this cleaning, a polishing agent, polished glass debris and other foreign matters attached onto the surface of the polished glass substrate can be removed, and hence the surface of the glass substrate is made cleaned, and further, can be made neutral. When the cleaning is insufficient, not only inconveniences are generated in a later inspection step, but also a quality necessary as a glass substrate is not obtained. Examples of a preferred cleaning method include a method in which the glass is first cleaned with a heat solution of sulfuric acid and aqueous hydrogen peroxide, then rinsed and cleaned with pure water and subsequently cleaned with a neutral surfactant solution. However, the cleaning method is not limited thereto, and other methods may be employed.

Also, it is preferred that the glass substrate to be processed by the processing method of a glass substrate according to the invention is subjected to preliminary polishing prior to carrying out the processing of the invention, thereby improving the flatness. Thus, the time required for the processing method of the invention can be shortened. In addition, after the processing of the invention, more excellent flatness and surface roughness are obtained. Though a method of the preliminary polishing is not particularly limited, it can be selected among known mechanical polishing methods used for polishing a glass surface. Specifically, they include, but are not limited to, lapping and polishing. Also, the polishing pad and polishing agent can be appropriately selected among known materials. Also, in addition to the polishing method solely owing to a polishing action with an abrasive grain, a chemical mechanical polishing method using a combination of a polishing action with an abrasive grain and a chemical polishing action with a chemical may be employed.

The preliminary polishing is carried out such that the flatness of the surface of the glass substrate is preferably not more than 500 nm, and more preferably not more than 400 nm in terms of PV. When the flatness exceeds 500 nm, it takes time in order to improve the flatness by the polishing method of the invention, thereby constituting a factor for an increase of costs. Also, the preliminary polishing is carried out such that the surface roughness of the glass substrate is preferably not more than 5 nm, and more preferably not more than 1 nm, in terms of RMS. When the surface roughness of the preliminarily polished glass substrate exceeds 5 nm, it takes time for achieving the polishing to a desired surface roughness by employing the polishing method of the invention, thereby constituting a factor for an increase of costs.

Also, the glass substrate to which the processing method of the invention is to be applied is preferably subjected to chamfering processing, prior to carrying out the processing of the invention, so as to give a chamfering width of from 0.2 to 0.4 mm for the purpose of suppressing a scratch due to breakage of an edge part.

EXAMPLES

The present invention will be illustrated in greater detail with reference to Example 1 and Example 2 set forth below, the invention should not be construed as being limited thereto.

Example 1

An ingot of a $TiO_2$-doped quartz glass (doping amount of $TiO_2$: 7% by mass) as manufactured by a known method was cut into a plate form of 153 mm in square and 6.75 mm in thickness by using an ID-saw slicer; and the plate was subjected to chamfering processing with a #120 diamond wheel by using an NC chamfering machine so as to have a chamfering width of from 0.2 to 0.4 mm, thereby preparing a glass substrate made of a $TiO_2$-doped quartz glass having an external dimension of 152 mm in square and 6.75 mm in thickness. This glass substrate was preliminarily polished by mechanical polishing. The surface of the glass substrate after the preliminary polishing was then subjected to measurement at an area of 142 mm in square by using a G310S Fizeau type interference flatness measuring instrument (manufactured by Fujinon Corporation). The results are shown in FIG. 1. FIG. 1 is a graph in which a flatness $S(x, y)$ is plotted against a point $(x, y)$ on the glass substrate of a two-dimensional shape in a contour interval of 10 nm. PV was 287 nm.

This preliminarily polished glass substrate was processed by gas cluster ion beam etching. The gas cluster ion beam etching was carried out by using a US50XP device, manufactured by Epion Corporation, and the entire surface of the substrate was processed by raster scanning of a gas cluster ion beam (first processing step).

The processing conditions were set up as follows.

Source gas: A mixed gas of 5 vol. % of $NF_3$ and 95 vol. % of $O_2$

Accelerating voltage: 30 keV

Ionizing current: 70 µA

Beam size of gas cluster ion beam (FWHM value): 6 mm

Figure 2:
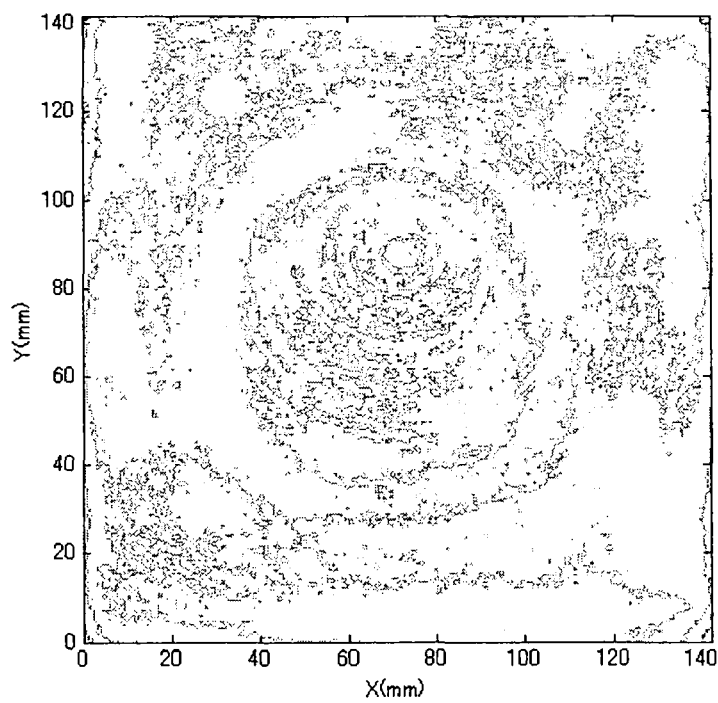
FIG. 2 is a graph of measurement results of the flatness after processing the glass substrate sample of FIG. 1 with a gas cluster ion beam (first processing step).

The flatness of the glass substrate after processing with a gas cluster ion beam was measured. A graph of the results plotted in a contour interval of 10 nm is shown in FIG. 2. The flatness was 107 nm in terms of PV. Also, the surface roughness was measured by using an atomic force microscope (SPA460, manufactured by Seiko Instruments Inc.) and was found to be 1.5 nm in terms of RMS.

Next, this glass substrate was subjected to finish polishing (second processing step) at a light load using colloidal silica as a polishing slurry. At that time, the processing conditions of the finish polishing were set up as follows.

Polishing testing machine: Duplex 24B polishing machine, manufactured by Hamai Co., Ltd.

Polishing pad: BELATRIX K7512, manufactured by Kanebo, Ltd.

Rotation number of polishing surface plate: 35 rpm

Polishing time: 20 minutes

Polishing load: 51 g/$cm^2$

Diluting water: Pure water (after filtering off foreign matters of 0.1 µm or greater)

Flow rate of slurry: 10 liters/min

Figure 3:
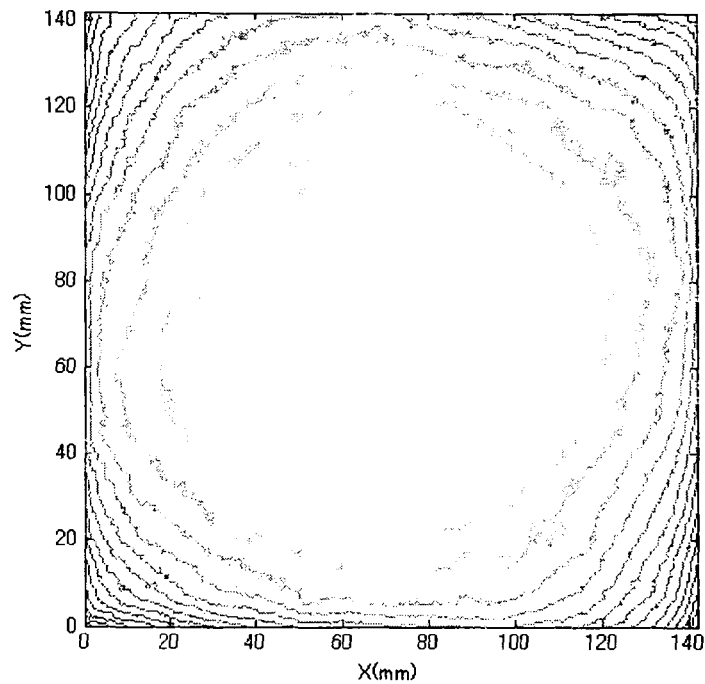
FIG. 3 is a graph of measurement results of the flatness after processing the glass substrate sample of FIG. 2 by finish polishing (second processing step).
Figure 4:
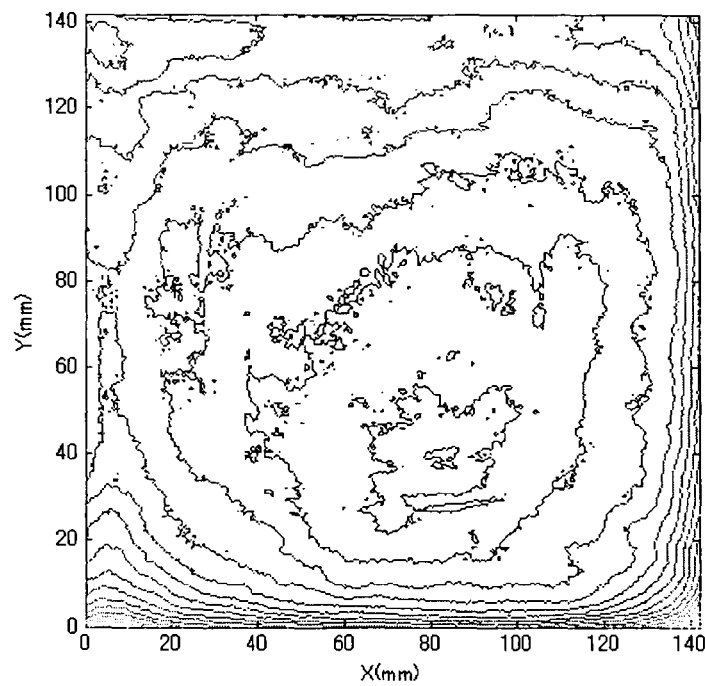
FIG. 4 is a graph of in-plane distribution of a processing amount by finish polishing (second processing step).

Polishing slurry: Containing 20% by mass of colloidal silica having an average primary particle size of less than 20 nm The flatness of the surface of the substrate after carrying out the finish polishing was measured. A graph of the results plotted in the same manner is shown in FIG. 3. The flatness was 186 nm in terms of PV. Also, the surface roughness of the surface of the substrate after the finish polishing was 0.07 nm in terms of RMS. An in-plane distribution $E_2(x, y)$ of the processing amount by the second processing step is determined from the difference in flatness (i.e., surface shape) of the surface of the glass surface before and after the second processing step. A graph in which the in-plane distribution $E_2(x, y)$ of the processing amount by the finish processing (second processing step) is plotted is shown in FIG. 4. The in-plane distribution of the processing amount was 170 nm in terms of PV.

Figure 5:
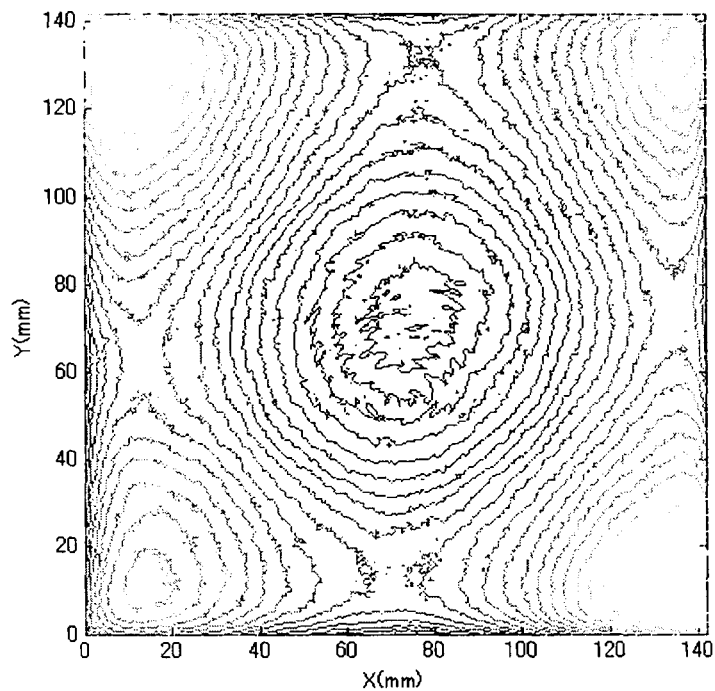
FIG. 5 is a graph of measurement results of the flatness of a glass substrate sample prior to carrying out the processing of the invention.

By using the in-plane distribution of the processing amount of the second processing step thus determined with respect to a similar glass substrate, processing by the processing method of the invention was applied to the $TiO_2$-doped quartz glass substrate. First of all, preliminary polishing was carried out by mechanical polishing, thereby obtaining a surface of the substrate having a PV of 239 nm as shown in a graph of flatness in FIG. 5. Next, the processing amount $E_1(x, y)$ at each point (x, y) within the surface was determined from the surface shape as shown in FIG. 5 and the in-plane distribution of the processing amount by finish polishing as shown in FIG. 4 according to the expression (1). The in-plane distribution of the processing amount $E_1(x, y)$ was shown in FIG. 6.

Figure 6:
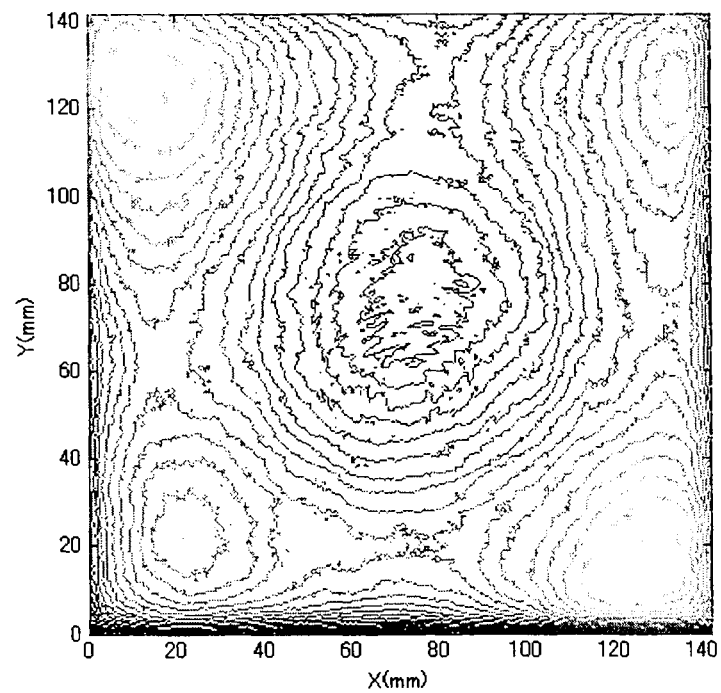
FIG. 6 is a graph of in-plane distribution of a processing amount $E_1(x, y)$ of a first processing step to be carried out by gas cluster ion beam etching.

Next, the entire surface of the substrate was subjected to raster scanning to achieve the first processing step by gas cluster beam etching on the basis of the in-plane distribution of the processing amount of FIG. 6. The processing amount $E_1(x, y)$ at each point (x, y) within the surface was set up by changing a movement rate for scanning a gas cluster ion beam, thereby changing the dose of the gas cluster ion beam.

Figure 7:
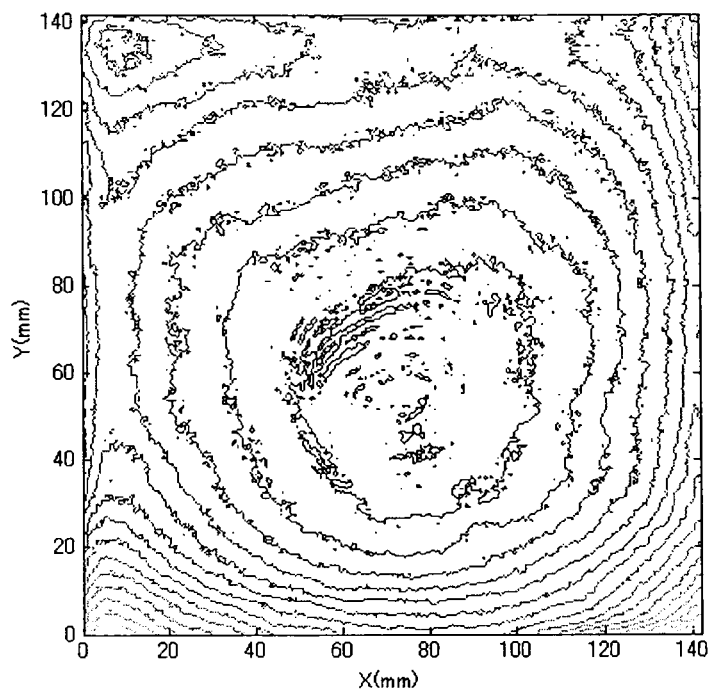
FIG. 7 is a graph of measurement results of the flatness of the glass substrate sample after carrying out the first processing step with the in-plane distribution of the processing amount $E_1(x, y)$ of FIG. 6.

The flatness of the surface of the substrate which had been thus subjected to gas cluster ion beam etching was measured in the same manner. The results are as shown in a graph of FIG. 7. The flatness was 186 nm in terms of PV. Also, the surface roughness measured in the same manner was 1.5 nm in terms of RMS.

Figure 8:
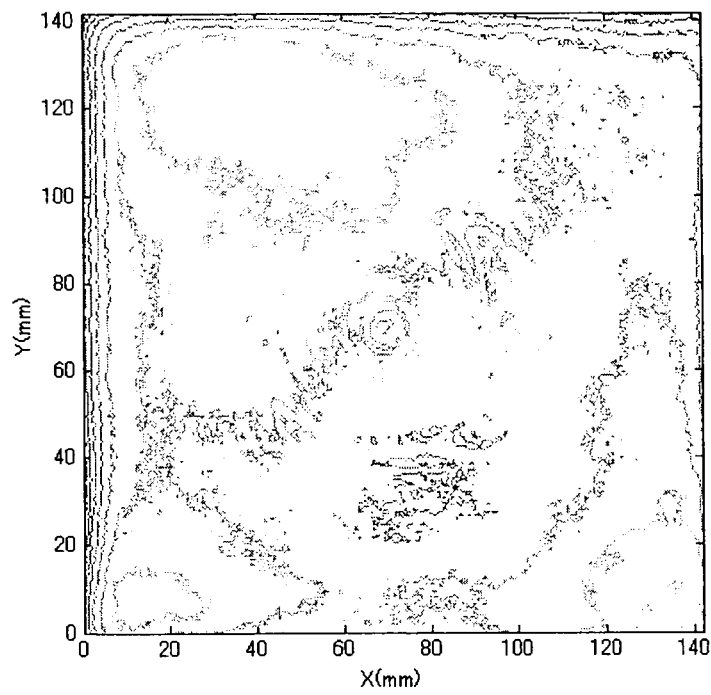
FIG. 8 is a graph of measurement results of the flatness after processing the glass substrate sample of FIG. 7 by finish polishing (second processing step).

Next, finish polishing (second processing step) was carried out under the same condition as those described above, thereby obtaining a surface of a substrate having a flatness as shown in FIG. 8.

The glass substrate after the finish polishing had a flatness of 0.097 µm in terms of PV and a surface roughness of 0.07 nm in terms of RMS. Also, a defect within a range of 142 mm×142 mm as an effective area of the surface of the substrate was examined by M1350, manufactured by Lasertec Corporation. As a result, a defect inherent to dry etching was not observed; the number of a concave defect having a width of 60 nm or more was not more than 3; and a convex defect having a width of 60 nm or more was not detected.

Example 2

Figure 9:
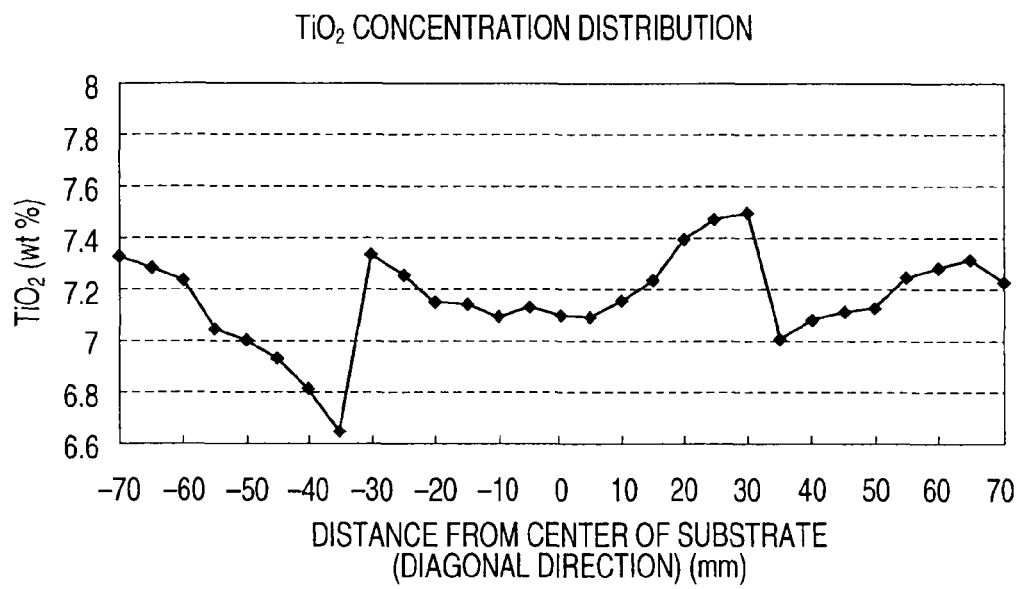
FIG. 9 shows a graph in which a $TiO_2$ concentration distribution in the $TiO_2$-doped quartz glass of Example 2 is plotted against the abscissa which represents the distance from the center of a substrate.

From an ingot of a $TiO_2$-doped quartz glass (doping amount of $TiO_2$: 7% by mass) of a different lot from Example 1, a square $TiO_2$-doped quartz glass substrate of 152.0 mm in square and 6.75 mm in thickness which was chamfered so as to have a chamfered width of from 0.2 to 0.4 mm was prepared and preliminarily polished by mechanical polishing in the same manner. By using a substrate sample of the same lot as this, a $TiO_2$ concentration distribution in the substrate was measured by fluorescent X-ray diffraction. A graph in which the $TiO_2$ concentration distribution in the substrate is plotted while taking the distance from the center of the substrate on an abscissa is shown in FIG. 9.

Next, with respect to a doped quartz glass containing $TiO_2$ as a dopant, the relationship between a dopant concentration and a processing rate by cluster ion beam etching was measured. First of all, doped quartz glass samples (20×20×1 mm) containing $TiO_2$ of 0%, 3.1%, 5.1%, 6.9% and 8.7%, respectively, in terms of mass % based on $SiO_2$ were prepared. These test samples having a different $TiO_2$ concentration were subjected to cluster ion beam etching under the same condition, thereby determining processing rates. For the measurement of the processing rates, a weight method of determining it from a change in weight of the test sample before and after the processing was employed. The conditions of the gas cluster beam etching were set up as follows.

Figure 10:
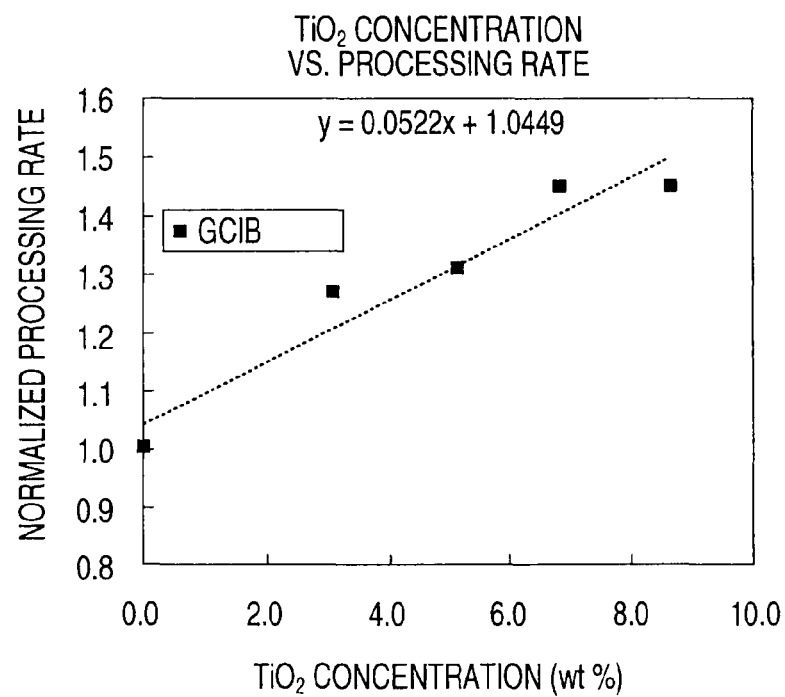
FIG. 10 is a graph in which changes in the processing rate of a $TiO_2$-doped quartz glass by gas cluster ion beam etching with $TiO_2$ concentrations are plotted.

Source gas: Containing 1.25 vol. % of $SF_6$, 24 vol. % of $O_2$ and 74.75 vol. % of Ar Accelerating voltage: 30 keV Ionizing current: 50 µA Beam size (FWHM value): 6 mm Dose: $6.2×10^{15}$ ions/$cm^2$ The results in which the measured processing rates were normalized while regarding the processing rate at a concentration of $TiO_2$ of 0% by mass as "1", and plotted are shown in FIG. 10. The correlation between the concentration X (% by mass) of the dopant ($TiO_2$) and the normalized processing rate Y is expressed by the following expression (2).

$$Y=0.0522X+1.0449 \qquad (2)$$

Next, by using the correlation between the dopant concentration which the glass substrate contains and the processing rate of the surface of the glass substrate (hereinafter also referred to as "correlation between dopant concentration and processing rate") and the dopant concentration distribution within the surface of the glass substrate, the processing conditions are set up. That is, at the time when the surface of the glass substrate is processed by a processing amount W (μm), a processing time T (minute) is defined as follows:

$$T=W/(Y \times Y_0)=W/\{(0.0522X+1.0449) \times Y_0\} \quad (3)$$

(wherein $Y_0$ represents the processing rate in case that the $TiO_2$ concentration in the glass is 0% by mass), and the scanning rate of the gas cluster ion beam is changed for each site of the glass substrate to change the dose, to set up the amount of process at each site of the surface of the substrate.

Assuming a two-dimensional coordinate system on the surface of the glass substrate, when a function to express the $TiO_2$ concentration distribution corresponding to FIG. 9 is regarded as C(x, y) (% by mass), a processing time T(x, y) (minute) corresponding to a processing amount $E_1$ (x, y) (μm) at a point (x, y) of the coordinate of the glass substrate is determined as follows.

$$T(x,y)=E_1(x,y)/\{(0.0522 \cdot C(x,y)+1.0449) \times Y_0\} \quad (4)$$

Here, $E_1$(x, y) is determined from the foregoing expression (1).

That is, by processing the surface of the substrate by raster scanning so as to give a processing time determined according to the expression (4), thereby controlling the dose at each point on the substrate, it is possible to process the surface of the glass substrate containing a dopant while suppressing a fluctuation from the desired processing amount distribution.

Industrial Applicability

By employing the processing method of a glass substrate of the invention, it is possible to manufacture a highly flat and highly smooth glass substrate with good productivity. In addition, it is possible to eliminate defects such as a scratch (concave defect) and a projection (convex defect) on the surface of the substrate, thereby realizing a reduction of defects.

While the present invention has been described in detail and with reference to specific embodiments thereof, it will be apparent to one skilled in the art that various changes and modifications can be made therein without departing from the spirit and scope thereof.

This application is based on Japanese Patent Application No. 2006-109937 filed Apr. 12, 2006, and the contents thereof are herein incorporated by reference.

The invention claimed is:

1. A processing method of a glass substrate by processing a surface of a glass substrate, which comprises:
    a flatness distribution measurement step of measuring a flatness of a first glass substrate prior to processing at each site within a surface of the substrate;
    a first processing step of processing the surface of the first glass substrate that has been subjected to the flatness distribution measurement while changing a processing condition for each site within the surface of the substrate;
    a second processing step of finish-polishing the surface of the first glass substrate that has been subjected to the first processing step; and
    a step of measuring an in-plane distribution of the processing amount of the first glass substrate by the second processing step, and
    further comprising, with respect to a second glass substrate having the same properties as the first glass substrate:
    a flatness distribution measurement step of measuring a flatness of the second glass substrate prior to processing at each site within a surface of the substrate;
    a first processing step of processing the surface of the second glass substrate that has been subjected to the flatness distribution measurement while changing a processing condition for each site within the surface of the substrate; and
    a second processing step of finish-polishing the surface of the second glass substrate that has been subjected to the first processing step,
    wherein a processing amount for each site within the surface of the second glass substrate in the first processing step is determined from the flatness distribution within the surface of the second glass substrate prior to processing as measured in the flatness distribution measurement step and the in-plane distribution of the processing amount of the first glass substrate by the second processing step.

2. A processing method of a glass substrate by processing a surface of a glass substrate, which comprises:
    a flatness distribution measurement step of measuring a flatness of a first glass substrate prior to processing at each site within a surface of the substrate;
    a first processing step of processing the surface of the first glass substrate that has been subjected to the flatness distribution measurement while changing a processing condition for each site within the surface of the substrate;
    a second processing step of finish-polishing the surface of the first glass substrate that has been subjected to the first processing step; and
    a step of measuring an in-plane distribution of the processing amount of the first glass substrate by the second processing step, and
    further comprising, with respect to a second glass substrate having the same properties as the first glass substrate:
    a flatness distribution measurement step of measuring a flatness of the second glass substrate prior to processing at each site within a surface of the substrate;
    a first processing step of processing the surface of the second glass substrate that has been subjected to the flatness distribution measurement while changing a processing condition for each site within the surface of the substrate; and
    a second processing step of finish-polishing the surface of the second glass substrate that has been subjected to the first processing step,
    wherein the first processing step for the first and second glass substrates are carried out by ion beam etching, gas cluster ion beam etching, plasma etching, or polishing with a magnetic viscous fluid; and
    wherein the processing condition for each site within the surface of the second glass substrate in the first processing step is determined from a processing amount that is determined from the flatness distribution within the surface of the second glass substrate prior to processing as measured in the flatness distribution measurement step and the in-plane distribution of the processing amount of the first glass substrate by the second processing step.

3. The processing method of a glass substrate according to claim 1, wherein the glass substrate is a glass substrate made of a quartz glass containing $SiO_2$ as a major component.

4. The processing method of a glass substrate according to claim 3, wherein the quartz glass is a $TiO_2$-doped synthetic quartz glass having a thermal expansion lower than undoped synthetic quartz glass.

5. The processing method of a glass substrate according to claim 4,
    wherein a relationship between a distribution of dopant concentration within the surface of the first glass substrate and a processing rate of the first processing step to the dopant concentration of the first glass substrate has been determined; and wherein the processing condition for each site within the surface of the second glass substrate in the first processing step is determined from:

a processing amount determined from the in-plane distribution of the processing amount of the first glass substrate by the second processing step and the flatness distribution of the surface of the second glass substrate prior to processing as measured in the flatness distribution measurement step;

a distribution of the dopant concentration; and the relationship between the processing rate in the first processing step and the dopant concentration.

6. The processing method of a glass substrate according to claim 2, wherein the first processing step for the first and second glass substrates is carried out by ion beam etching.

7. The processing method of a glass substrate according to claim 2, wherein the first processing step for the first and second glass substrates is carried out by gas cluster ion beam etching.

8. The processing method of a glass substrate according to claim 2, wherein the first processing step for the first and second glass substrates is carried out by plasma etching.

9. The processing method of a glass substrate according to claim 2, wherein the first processing step for the first and second glass substrates is carried out by polishing with a magnetic viscous fluid.

10. The processing method of a glass substrate according to claim 1, wherein the finish-polishing is conducted with a polishing slurry.

11. The processing method of a glass substrate according to claim 10, wherein the finish-polishing is performed by interposing and setting a glass substrate between polishing plates provided with a polishing pad and relatively rotating the polishing plates against the glass substrate while feeding a polishing slurry adjusted so as to have prescribed properties.

12. The processing method of a glass substrate according to claim 11, wherein the polishing pad is a non-woven fabric or a polishing cloth.

13. The processing method of a glass substrate according to claim 10, wherein the polishing slurry comprises colloidal silica.

14. The processing method of a glass substrate according to claim 13, wherein the colloidal silica amount in the polishing slurry ranges from 10 to 30% by mass.

15. The processing method of a glass substrate according to claim 13, wherein the polishing slurry comprises colloidal silica having an average primary particle size of not more than 50 nm and water and adjusted so as to have a pH in the range of from 0.5 to 4.

16. The processing method of a glass substrate according to claim 1, wherein the finish-polishing is conducted at a surface pressure ranging from 20 to 100 $g_f/cm^2$.

17. The processing method of a glass substrate according to claim 1, wherein the processing amount of the finish-polishing ranges from 10 to 200 nm.

18. The processing method of a glass substrate according to claim 2, wherein the glass substrate is a glass substrate made of a quartz glass containing $SiO_2$ as a major component.

19. The processing method of a glass substrate according to claim 18, wherein the quartz glass is a $TiO_2$-doped synthetic quartz glass having a thermal expansion lower than undoped synthetic quartz glass.

20. The processing method of a glass substrate according to claim 19, wherein a relationship between a distribution of dopant concentration within the surface of the first glass substrate and a processing rate of the first processing step to the dopant concentration of the first glass substrate has been determined; and wherein the processing condition for each site within the surface of the second glass substrate in the first processing step is determined from:

a processing amount determined from the in-plane distribution of the processing amount of the first glass substrate by the second processing step and the flatness distribution of the surface of the second glass substrate prior to processing as measured in the flatness distribution measurement step;

a distribution of the dopant concentration; and the relationship between the processing rate in the first processing step and the dopant concentration.

21. The processing method of a glass substrate according to claim 2, wherein the finish-polishing is conducted with a polishing slurry.

22. The processing method of a glass substrate according to claim 21, wherein the finish-polishing is performed by interposing and setting a glass substrate between polishing plates provided with a polishing pad and relatively rotating the polishing plates against the glass substrate while feeding a polishing slurry adjusted so as to have prescribed properties.

23. The processing method of a glass substrate according to claim 22, wherein the polishing pad is a non-woven fabric or a polishing cloth.

24. The processing method of a glass substrate according to claim 22, wherein the polishing slurry comprises colloidal silica.

25. The processing method of a glass substrate according to claim 24, wherein the colloidal silica amount in the polishing slurry ranges from 10 to 30% by mass.

26. The processing method of a glass substrate according to claim 24, wherein the polishing slurry comprises colloidal silica having an average primary particle size of not more than 50 nm and water and adjusted so as to have a pH in the range of from 0.5 to 4.

27. The processing method of a glass substrate according to claim 2, wherein the finish-polishing is conducted at a surface pressure ranging from 20 to 100 $g_f/cm^2$.

28. The processing method of a glass substrate according to claim 2, wherein the processing amount of the finish-polishing ranges from 10 to 200 nm.

* * * * *